United States Patent
Bjarnason et al.

(10) Patent No.: US 12,526,216 B2
(45) Date of Patent: Jan. 13, 2026

(54) SYSTEMS AND METHODS FOR NETWORK ANOMALY DETECTION AND POLICY-BASED NETWORK STATE RESTORATION

(71) Applicant: NetScout Systems, Inc., Westford, MA (US)

(72) Inventors: Steinthor Bjarnason, Fjerdingby (NO); Roland Dobbins, Sarasota, FL (US)

(73) Assignee: NetScout Systems, Inc., Westford, MA (US)

( * ) Notice: Subject to any disclaimer, the term of this patent is extended or adjusted under 35 U.S.C. 154(b) by 0 days.

(21) Appl. No.: 18/731,159

(22) Filed: May 31, 2024

(65) Prior Publication Data

US 2025/0007800 A1   Jan. 2, 2025

Related U.S. Application Data

(60) Provisional application No. 63/524,416, filed on Jun. 30, 2023.

(51) Int. Cl.
*H04L 43/08* (2022.01)
*H04L 9/40* (2022.01)
*H04L 69/00* (2022.01)

(52) U.S. Cl.
CPC .......... *H04L 43/08* (2013.01); *H04L 63/1425* (2013.01); *H04L 69/02* (2013.01)

(58) Field of Classification Search
None
See application file for complete search history.

(56) References Cited

U.S. PATENT DOCUMENTS

| | | | | |
|---|---|---|---|---|
| 8,509,071 B1 * | 8/2013 | Narayanaswamy | .... | H04L 47/20 370/235 |
| 8,554,883 B2 * | 10/2013 | Sankaran | ............ | H04L 41/0813 370/328 |
| 9,391,802 B2 * | 7/2016 | George | ............... | H04L 12/4641 |
| 9,473,456 B2 * | 10/2016 | Caputo, II | .............. | H04L 45/30 |
| 10,255,574 B2 * | 4/2019 | Kakade | .............. | G06Q 10/0635 |
| 11,050,770 B2 * | 6/2021 | Nanda | .................. | H04L 63/1425 |
| 12,235,736 B2 * | 2/2025 | Mufti | ................... | G06F 11/1464 |
| 2006/0288183 A1 * | 12/2006 | Boaz | .................... | G06F 11/1451 711/164 |

(Continued)

*Primary Examiner* — Jason D Cardone
(74) *Attorney, Agent, or Firm* — Foley & Lardner LLP

(57) ABSTRACT

A method for network anomaly detection and policy-based network state restoration includes collecting a first set of metrics associated with a network at a first time indicating a first state of the network and storing the first set of metrics in association with the first state in a memory at the first time. A second set of metrics associated with the network is collected at a second time indicating a second state of the network. An indication of an anomaly on the network is determined based on a comparison of the second set of metrics with the first set of metrics. A network policy is applied to revert the network from the second state to the first state by restoring configuration parameters and operational settings of the network to match the stored first set of metrics exactly as recorded at the first time in response to determining the indication of the anomaly. The network may be monitored in response to applying the network policy and action may be taken based on the monitoring.

20 Claims, 7 Drawing Sheets

(56) References Cited

U.S. PATENT DOCUMENTS

| | | | | |
|---|---|---|---|---|
| 2016/0359912 | A1* | 12/2016 | Gupta | H04L 41/0893 |
| 2016/0366170 | A1* | 12/2016 | Bell | H04L 63/1425 |
| 2017/0318034 | A1* | 11/2017 | Holland | G06N 20/10 |
| 2018/0232031 | A1* | 8/2018 | Swierk | H04L 43/20 |
| 2021/0168014 | A1* | 6/2021 | Tse | H04L 43/14 |
| 2021/0288867 | A1* | 9/2021 | Sasaki | H04L 45/28 |
| 2022/0014947 | A1* | 1/2022 | Smith | H04W 24/04 |
| 2022/0321476 | A1* | 10/2022 | Williams | H04L 45/22 |
| 2023/0164176 | A1* | 5/2023 | Bjarnason | H04L 63/1416 |
| | | | | 726/23 |
| 2023/0236939 | A1* | 7/2023 | Mufti | G06F 11/1469 |
| | | | | 707/675 |
| 2023/0401127 | A1* | 12/2023 | Kumar | G06F 11/1464 |
| 2025/0274339 | A1* | 8/2025 | El Mahdawy | H04L 41/0663 |

* cited by examiner

| Time | Metrics | | Response Time | State |
|------|---------|---|---------------|-------|
| T1 | - | Client population:<br>  USA = p1, Europe = p2<br>Network traffic:<br>  UDP 53 = n1, TCP 443 = n2 | DNS: t1<br>Web: t2 | Normal |
| T2 | - | Client population:<br>  USA = p3, Europe = p4<br>Network traffic:<br>  UDP 53 = n3, TCP 443 = n4 | DNS: t3<br>Web: t4 | Normal |
| T3 | - | Client population:<br>  USA = p5, Europe = p6, China = p7<br>Network traffic:<br>  UDP 53 = n5, TCP 443 = n6, UDP 11211 = n7 | DNS: t5<br>Web: t6 | Potential Anomaly |

FIG. 3

SYSTEMS AND METHODS FOR NETWORK ANOMALY DETECTION AND POLICY-BASED NETWORK STATE RESTORATION

CROSS-REFERENCE TO RELATED APPLICATIONS

This application claims the benefit of priority U.S. Provisional Application No. 63/524,416 filed Jun. 30, 2023, the entirety of which is incorporated by reference herein.

BACKGROUND

Digital services can be provided by servers to client devices via a telecommunications network (also referred to herein as a "network"). For example, servers can provide access to web sites, applications, content, or other digital services. A monitoring system may monitor the network for adverse conditions (e.g., anomalies). The anomalies in the network may be indicative of one or more potentially disruptive events, such as distributed-denial-of-service (DDOS) attacks, route hijacking, service delivery element misconfiguration, unintentional network traffic excursions, or network infrastructure element failures, among others.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 is an example showing temporal context monitoring and enforcement for telecommunications networks, in accordance with an implementation;

DETAILED DESCRIPTION

Figure 1:
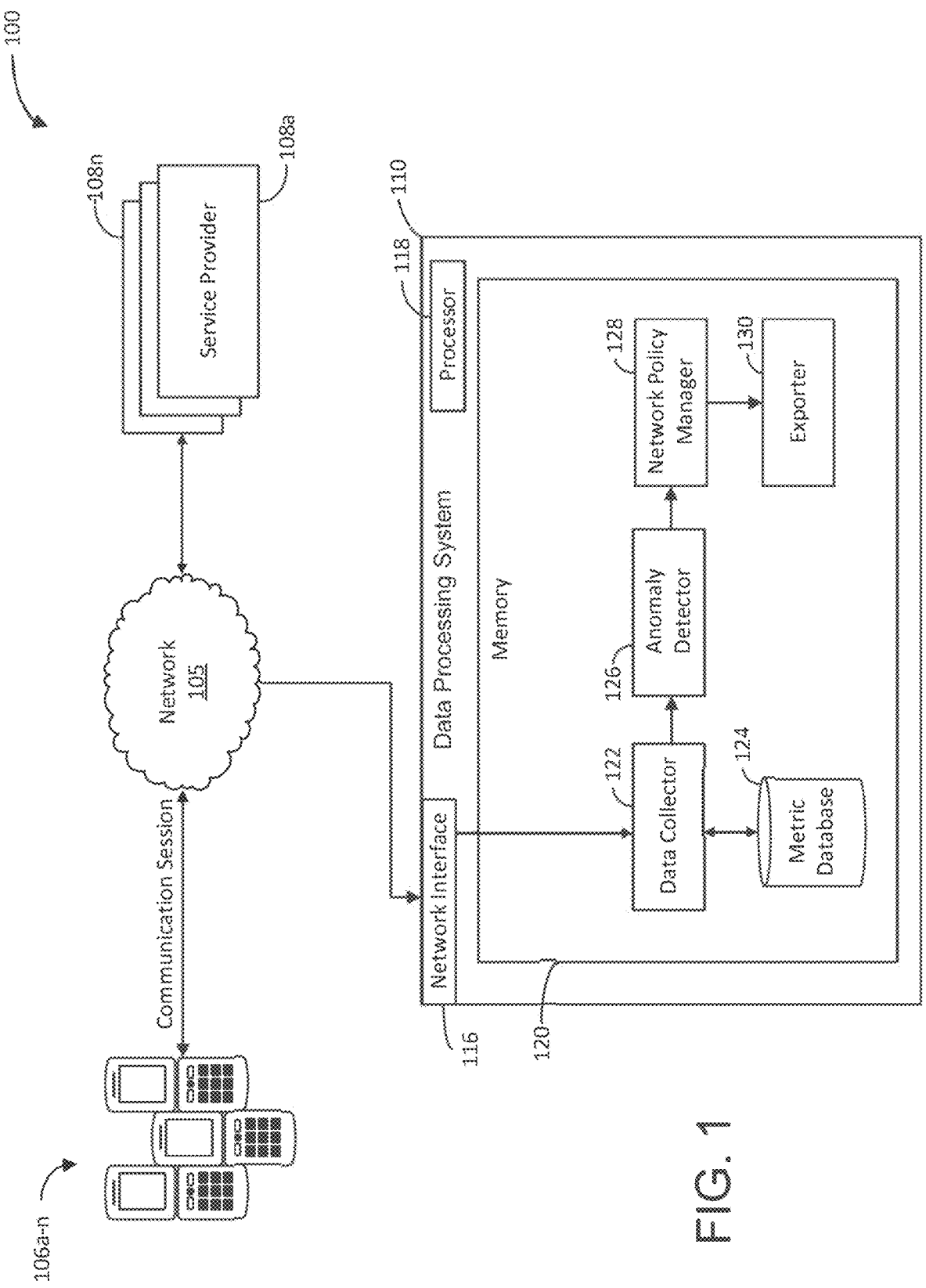
FIG. 1 is an illustration of a system for temporal context monitoring and enforcement for telecommunications networks, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A network monitoring system may detect anomalies, determine a type of anomaly, generate a countermeasure specific to the type of anomaly, and apply the countermeasure to a network experiencing the anomaly. For example, the network monitoring system may detect an anomaly on a network (e.g., a telecommunications network). The anomaly may be associated with a disruptive event. For example, the anomaly may be caused by the disruptive event occurring on the network. The disruptive event may be of a type of event (e.g., a type of network attack, a DDOS attack, route hijacking, service delivery element misconfiguration, an unintentional network traffic excursion, or a network infrastructure element failure). The network monitoring system may determine the type of the disruptive event and/or the anomaly based on situationally specific circumstances (e.g., specifics of unwanted and/or harmful network traffic, perceived traffic source behaviors, a severity and/or scope of network fluctuations, etc.). Responsive to determining the type, the network monitoring system may generate one or more rules (e.g., a countermeasure) specific to the type of event and/or anomaly. The network monitoring system may then apply the rules to the network to potentially stop or limit the anomaly. While this method can generally be a rapid process, a faster process (e.g., instantaneous) that can return the network to a previous known-good state can be advantageous. For example, returning the network to the good state can achieve partial service recovery and forestall disruption from subsequent anomalies and network traffic excursions, among other negative events, with decreased latency (e.g., instantaneously).

A computer implementing the systems and methods described herein may return the network to a previous known-good state. For example, the computer may operate to collect sets of metrics associated with respective periods of time (e.g., one set per period of time) for determining states of operation of a network. The computer may operate to store the sets of metrics, the respective periods of time, and the states associated with each set of metrics. The computer may operate to detect an indication of an anomaly on the network (e.g., an anomaly caused by a potential attack). To do so, the computer may compare a first set of metrics indicating a first state (e.g., a good or normal state) with a second set of metrics (e.g., a current set of metrics, a set of metrics associated with a most recent period of time). The computer may generate (e.g., evaluate, calculate, determine) one or more network policies to revert the network from the second state (e.g., a state of undesirable network conditions, an anomalous state, a bad state, a current temporal state) to the first state (e.g., irrespective of a type of the anomaly, information regarding the causes of the anomaly, sources, affected services/applications/servers/content/infrastructure, etc.).

To detect the indication of the anomaly, the computer may compare a current set of metrics with a previous set of metrics. For example, the computer may store multiple sets of metrics (e.g., network attributes) over a period of time (e.g., snapshots of network conditions at specific times) as part of a continuous multidimensional analysis of the network. The computer may capture (e.g., collect, gather, obtain, receive, record) the sets of metrics periodically, aperiodically, at discrete intervals, or responsive to an event, among other times. The computer may store the sets of metrics in memory, in a cloud, in a database, or another storage system. The computer may determine a state of operation associated with each set of metrics and store an indication of the state with the respective set of metrics. For example, the computer may determine the state of operation based on comparing a current set of metrics to a previously stored set of metrics with a known state of operation. The previous set of metrics may be a most recently stored set of metrics, a set of metrics associated with a confidence score of the state of operation, or another set of metrics. The known state of operation may be a normal state of operation (e.g., a state of operation determined to not include anomalies, a state of operation including desirable network traffic and/or network conditions). The computer may compare the current state to the known state (e.g., compare the current set of metrics to the previous set of metrics, discern contemporaneous changes in various network attributes). Responsive to determining differences between the two, the computer may determine whether the current state is an anomalous state.

To generate the network policies, the computer may employ (e.g., use, utilize) one or more techniques. For example, the computer may use a network access control technique, a quality-of-service (QOS) technique, routing tables updates, intelligent DDOS mitigation systems (IDMSes), application/service/content entitlement techniques, or domain name system (DNS) record updates, among other techniques. The computer may use the techniques automatically in response to detecting an anomaly (e.g., regardless of a type of the anomaly). The computer may restore (e.g., revert, mimic) the network to a previous state of the network by using the techniques to enforce (e.g., limit, apply rules) conformance of the network (e.g., traffic on the network) to the previous state (e.g., within allowable parameters derived from attribute values recorded with the previous state).

The techniques described herein may result in various improvements in maintaining network stability. For example, adopting the temporal context monitoring and enforcement process described herein for telecommunications networks may allow for reduced latency for anomaly responses, increased adaptability to different types of anomalies (e.g., any type of anomaly, situationally-independent responses), restoration of network stability and functionality, improved reliability for anomaly responses, increased time for determining the type of anomaly and type specific anomaly responses (e.g., after reverting back to a known state, analyzing the anomalous state and generating type specific responses to be applied at a later time), reduced risk of overblocking (e.g., blocking desirable/good/legitimate network traffic) among other advantages.

FIG. 1 illustrates an example system 100 for temporal context monitoring and enforcement for telecommunications networks, in some embodiments. The system 100 may provide improved network anomaly response and monitoring of a network using temporal context monitoring and enforcement. In brief overview, the system 100 can include, access, or otherwise interface with one or more of client devices 106a-n (hereinafter client device 106 or client devices 106), service providers 108a-n (hereinafter service provider 108 or service providers 108), and data processing system 110. The service providers 108 can each include a set of one or more servers 502, depicted in FIG. 5A, or a data center 508, also depicted in 5A. The data processing system 110 can collect data from the network 105 and store sets of metrics regarding communication sessions between the client devices 106 and the service providers 108 at different periods of time. The data processing system 110 can determine an indication of an anomaly on the network 105 based on a comparison between two or more sets of metrics associated with different periods of time. The data processing system 110 can apply a network policy to revert the network 105 from a second state (e.g., an anomalous state) to a first state (e.g., a state of normal operations before the anomaly).

The client devices 106, the service providers 108, and/or the data processing system 110 can include or execute on one or more processors or computing devices (e.g., the computing device 503 depicted in FIG. 5C) and/or communicate via the network 105. The network 105 may be a telecommunications network and can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can stream videos in video sessions provided by service providers 108 or otherwise communicate with the servers of the service providers 108 for data. In some embodiments, network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

Each of the client devices 106, the service providers 108, and/or the data processing system 110 can include or utilize at least one processing unit or other logic device such as programmable logic array engine, or module configured to communicate with one another or other resources or databases. The components of the client devices 106, the service providers 108, and/or the data processing system 110 can be separate components or a single component. System 100 and its components can include hardware elements, such as one or more processors, logic devices, or circuits.

Still referring to FIG. 1, and in further detail, system 100 can include the service providers 108. The service providers 108 may each be or include servers or computers configured to transmit or provide services across network 105 to client devices 106. The service providers 108 may transmit or provide such services upon receiving requests for the services from any of the client devices 106. The term "service" as used herein includes the supplying or providing of information over a network, and is also referred to as a communications network service. Examples of services include 5G broadband services, any voice, data or video service provided over a network, smart-grid network, digital telephone service, cellular service, Internet protocol television (IPTV), etc.

Client devices 106 can include or execute applications to receive data from the service providers 108. For example, a client device 106 may execute a video application upon receiving a user input selection that causes the client device 106 to open the video application on the display. Responsive to executing the video application, a service provider 108 associated with the video application may stream a requested video to the client device 106 in a communication session. In another example, a client device 106 may execute a video game application. Responsive to executing the video game application, a service provider 108 associated with the video game application may provide data for the video game application to the client device 106. The client devices 106 may establish communication sessions with the service providers 108 for any type of application or for any type of call.

A client device 106 can be located or deployed at any geographic location in the network environment depicted in FIG. 1. A client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 510 depicted in FIG. 5B). If the client device 106 is deployed in a cloud 510, the client device 106 can include or be referred to as a virtual client device or virtual machine. In the event the client device 106 is deployed in a cloud 510, the packets exchanged between the client device 106 and the service providers 108 can still be retrieved by the data processing system 110 from the network 105. In some cases, the client devices 106 and/or the data processing system 110 can be deployed in the cloud 510 on the same computing host in an infrastructure 516 (described below with respect to FIG. 5B).

As service providers 108 provide or transmit data in communication sessions to client devices 106, the data processing system 110 may intercept or otherwise monitor the control plane signaling data (e.g., control plane signaling data packets) of the communication sessions. The data processing system 110 may include one or more processors that are connected to a network equipment manufacturer (NEM) trace port of network 105.

Data processing system 110 may comprise one or more processors that are configured to collect (e.g., obtain, receive) control plane signaling data and determine sets of metrics from the collected control plane signaling data. The data processing system 110 may comprise a network interface 116, a processor 118, and/or memory 120. The data processing system 110 may communicate with any of the client devices 106 and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, computer-readable instructions, etc.) stored in the memory 120 to facilitate the operations described herein. The memory 120 may be any volatile or non-volatile computer-readable storage medium capable of storing data or computer code.

Memory 120 may include a data collector 122, a metric database 124, an anomaly detector 126, a network policy manager 128, and an exporter 130, in some embodiments. In brief overview, the components 122-130 may collect sets of metrics associated with the network 105 at different periods of time and store the sets of metrics (e.g., maintain and update a table of metrics). The sets of metrics may be associated with different states of operation of the network 105 (e.g., a normal state of operation, a good state of operation, an anomalous state of operation). The components 122-130 may detect (e.g., determine, generate, calculate) an indication of an anomaly on the network 105 based on a comparison of a second set of metrics with a first set of metrics that indicate a first state of operation (e.g., normal or good). The components 122-130 may generate (e.g., calculate, determine) a network policy (e.g., network restrictions, network traffic rules) to revert the network 105 from the second state (e.g., potentially anomalous state) to the first state by applying the network policy on the network 105.

The data collector 122 may comprise programmable instructions that, upon execution, cause the processor 118 to obtain or collect data (e.g., control plane signaling data packets) from the network 105. In some cases, the collected data may be associated with various metrics. For example, the data may be associated with communications relationships, network traffic rates and composition, source counts and distribution, queries/see, packet sizes, and routing table entries, among other observable and quantifiable network attributes. The metrics may include packet level metrics (e.g., classless inter-domain routing (CIDR), autonomous system number (ASN), Geographical information, time-to-live (TTL), packet sizes in and out), application metrics (e.g., various DNS, hypertext transfer protocol (HTTP), and session initiation protocol (SIP) fields and values), traffic metrics (e.g., network traffic analysis, client traffic analysis), and service responses (e.g., network metrics, application response times), among other metrics associated with the network 105.

In some examples, the data collector 122 may collect the data continuously. For example, the data collector 122 may collect the data at discrete time intervals, periodically, aperiodically, or in response to an event (e.g., a trigger). The data collector 122 may generate a set of metrics based on the collected data being collected at a time interval (e.g., during a time period). The data collector 122 may generate a respective set of metrics for each time data is collected. The data collector 122 may store (e.g., record) the sets of metrics in the metric database 124.

The metric database 124 may be a database (e.g., relational, non-relational, object oriented) that stores the sets of metrics and associated time period data, among other potential data. In some cases, the data collector 122 may store such data from multiple communication sessions between different nodes with identifiers to distinguish between the communication sessions. In some examples, the data collector 122 may store the data in memory instead of the metric database 124. The data collector 122, the processor 118, and/or another component of the memory 120 may retrieve data from the metric database 124 to analyze the network 105, determine indications of an anomaly, and generate network policies, among other uses.

The anomaly detector 126 may comprise programmable instructions that, upon execution, cause the processor 118 to detect anomalies that occur at the network 105. In some cases, the anomaly detector 126 may analyze a set of metrics to determine whether the set of metrics is associated with an anomalous state of the network 105. To do so, the anomaly detector 126 may compare the set of metrics to another set of metrics, aggregate (e.g., average) values of multiple sets of metrics, or predefined values associated with the set of metrics. The anomaly detector 126 may determine a difference between the set of metrics and the other set of metrics. In some cases, the difference satisfying a threshold may indicate a potential anomaly. In some cases, an operator may determine whether the difference indicates a potential anomaly. The anomaly detector 126 may detect the indication (e.g., detect the difference satisfies the threshold, receive input from the operator) and notify the network policy manager.

The network policy manager 128 may comprise programmable instructions that, upon execution, cause the processor 118 to generate (e.g., calculate, determine) one or more network policies for the network 105. For example, the network policy manager 128 may generate multiple network policies, each with an associated estimate of impact (e.g., how the policy may impact the network, potential risk of overblocking, etc.). The network policy manager 128 or the operator may select a policy from the multiple policies to apply to the network based on the estimates of impact (e.g., choose the policy with the least impact). In some cases, the network policy manager 128 may generate a single network policy to revert a current state of the network 105 to a previous (known) state of the network 105. In some examples, the network policy manager 128 may use a network access control technique, a QOS technique, routing table updates, IDMSes, application/service/content entitlement techniques, or domain name system (DNS) record updates, among other techniques to generate the network policies. The network policy manager 128 may generate the policies regardless of the type of anomaly detected.

The network policy manager 128 may comprise programmable instructions that, upon execution, cause the processor 118 to apply (e.g., implement, update) the generated (selected) policy to the network 105. For example, the network policy manager 128 may apply one or more rules associated with the generated policy. The rules may restrict (e.g., limit, ban, reject) types of network traffic or other network attributes to match the previous state (e.g., a good state) of the network 105, as described herein with reference to FIG. 3, as an example. By matching the current state of the network 105 to a known state of the network 105, the network policy manager 128 can revert the state of the network 105 to a previous state without the indication of an anomaly. The network policy manager 128 (or the operator) may then analyze the indication of anomaly and determine next steps (e.g., to prevent the indication, to stop the anomaly, to generate situationally specific policies to block an attack associated with the anomaly, etc.).

The exporter 130 may comprise executable instructions that, upon execution by the processor 118, may export the generated network policies, indications of the anomaly, indications of the sets of metrics, predictions for a type of the anomaly, or any combination thereof (e.g., generated data), to the data processing system 110, the service providers 108, or another computing device. For example, the exporter 134 may create an exportable file (e.g., a file with a format such as BIL, GRD/TAB, PNG, ASKII, KMZ, etc.) from the generated data and transmit the exportable file to the computing device for display. The exporter 130 may transmit the exportable file to the computing device responsive to a request from the computing device. In some embodiments, the exporter 130 may generate and/or export exportable files to the computing device at set intervals to provide the computing device with real-time updates of the performance of communication sessions between nodes. In some cases, the exporter 134 may export the generated data by streaming the generated data or sending the generated data via a log output, among other various forms of transferring data.

Figure 2:
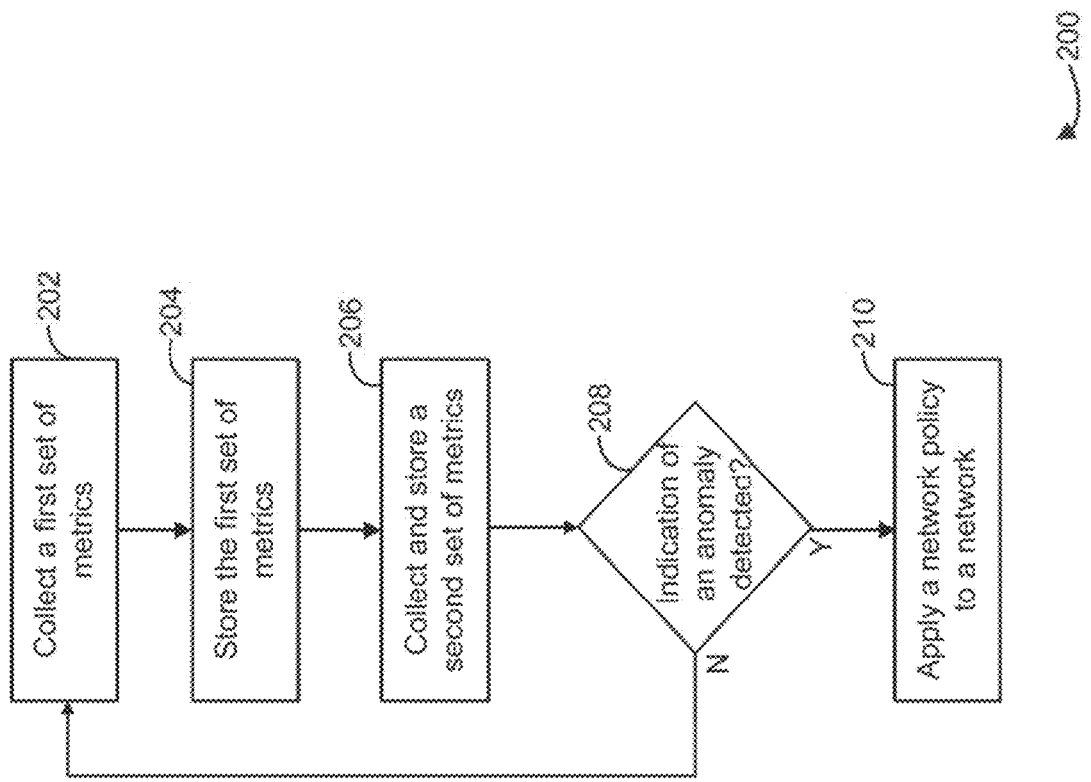
FIG. 2 is a flow diagram of a process for temporal context monitoring and enforcement for telecommunications networks, in accordance with an implementation.

FIG. 2 is an illustration of a flow diagram of a process 200 for temporal context monitoring and enforcement for telecommunications networks, in accordance with an implementation. The process 200 can be performed by a data processing system (a client device, the data processing system 110, shown and described with reference to FIG. 1, a server system, etc.). The process 200 may include more or fewer operations and the operations may be performed in any order. Performance of the process 200 may enable the data processing system to collect sets of metrics associated with different time intervals of a network. The sets of metrics may indicate multiple types of states of the network. Based on a comparison between multiple sets of metrics, the process 200 may enable the data processing system to generate one or more network policies and apply the network policy to the network. By applying the network policy to the network, the data processing system can revert a state of the network to a previous state of the network.

At operation 202, the data processing system collects a first set of metrics associated with a network at a first time. The data processing system may collect the first set of metrics at the first time (e.g., a time period, a time interval) based on a periodic interval, an aperiodic interval, or other trigger. The first set of metrics may indicate a first state of the network. For example, the first set of metrics may indicate a state of normal or good operation of the network. The first set of metrics may indicate desirable network traffic and network performance are being maintained (e.g., conducted). The first set of metrics may include one or more packet level metrics, one or more application metrics, one or more traffic metrics, or one or more service response metrics. In some cases, the data processing system may collect the first set of metrics by collecting, over a period of time, multiple sets of metrics indicating the first state and determining the first set of metrics based on a combination of each set of metrics of the multiple sets. At operation 204, the data processing system stores (e.g., record) the first set of metrics, the first state, the first time, or indications thereof, among other data.

At operation 206, the data processing system collects a second set of metrics associated with the network at a second time. The second set of metrics may indicate a second state of the network. The second state may be a state of anomaly. The data processing system may collect the second set of metrics similarly to the first set of metrics, but at a time (the second time) after the first time, and store the second set of metrics similarly to the first set of metrics. In some cases, the second set of metrics may at least comprise one or more packet level metrics, one or more application metrics, one or more traffic metrics, or one or more service response metrics. At operation 208, the data processing system determines whether the second set of metrics indicate an anomalous state. The data processing system may determine an indication of an anomaly (e.g., potentially caused by an attack) on the network based on a comparison of the second set of metrics with the first set of metrics. To do so, the data processing system may determine a difference between the second set of metrics and the first set of metrics. If the difference satisfies a threshold (e.g., are outside of normal operations), the data processing system may determine the second set of metrics indicate the second state of the network and determine the indication of the anomaly and continue to operation 210, otherwise the data processing system may return to operation 202. In some cases, the data processing system may compare the second set of metrics with an aggregate value of the first set of metrics and other previous sets of metrics indicating the first state.

At operation 210, the data processing system applies a network policy to revert the network from the second state to the first state in response to determining the indication of the anomaly. To do so, the data processing system may generate a set of network rules associated with limiting network traffic on the network. In some cases, the set of network rules may be associated with multiple network policies. The data processing system may select a subset of the set of network rules based on associated estimates of impact on the network if the respective rule were to be applied. For example, the data processing system may select a network rule of the set to be a part of the network policy based on a lowest estimate of impact value among similar network rules of the set. In some cases, applying the network policy includes selecting at least one of the first set of metrics to implement on the network. For example, the data processing system may select a first metric of the first set of metrics. The data processing system may generate one or more network rules to revert an associated metric of the second set of metrics to the first metric (e.g., the data processing system may restrict a source of network traffic to only be from sources of the first state).

In some implementations, the data processing system may monitor the network in response to applying the network policy. For example, the data processing system may monitor an effect of the network policy on the network (e.g., on metrics or attributes of the network). Based on the monitoring, the data processing system may take action (e.g., perform an action of a set of actions). For example, the action taken may include adjusting the network policy to increase a limitation of network traffic on the network or to reduce a limitation of network traffic on the network responsive to determining an impact of the network policy on the network (e.g., if the network policy is overblocking a percentage of desirable network traffic the data processing system may reduce the limitation). The action taken may include determining a type of anomaly associated with the anomaly, applying a second network policy based on the type of anomaly, and removing the network policy responsive to applying the second network policy. For example, by applying the network policy, the data processing system may increase an amount of time available to determine the type of the anomaly based on situationally specific circumstances and generate the second network policy, in which the situationally specific circumstances are addressed. The second network policy may be a type specific policy specialized in addressing the determined type of anomaly (e.g., more accurate network rules to specifically target the type of anomaly occurring). The data processing system may continue to monitor the network and determine that the anomaly has ended. The data processing system may remove (e.g., end, revert, change) the network policy, the second network policy, or both, based on the determination.

FIG. 3 is a table 300 providing an example for temporal context monitoring and enforcement for telecommunications networks, in accordance with an implementation. The table 300 includes a first column 302, a second column 304, a third column 306, a fourth column 308, a first row 310, a second row 312, and a third row 314. The first column 302 includes time data, the second column 304 includes first one or more metrics (e.g., network metrics, network attributes), the third column 306 includes second one or more metrics (e.g., response times), the fourth column 308 includes an indication of a type of state (e.g., a state of the network), the first row 310 may be associated with a first set of metrics collected at a first time, T1, the second row 312 may be associated with a second set of metrics collected at a second time, T2, and the third row 314 may be associated with a third set of metrics collected at a third time, T3. The table 300 may include more or fewer columns or rows, where each column or row may indicate a different type of data than illustrated (e.g., the FIG. 3 is for illustrative purposes of one example and many other examples are possible and contemplated).

In some cases, a network monitoring system (e.g., the data processing system 110) may collect network data. The network monitoring system may store the collected data in a database (e.g., the metric database 124). The network monitoring system may collect the data at different times. For example, at T1, the network monitoring system may collect various metrics. The metrics may include client population per country, continent, sector, area, etc.; network traffic per traffic type; response times per type; and other metrics. In an example of FIG. 3, the row 310 can include both USA and Europe client populations of p1 (e.g., 90%) and p2 (e.g., 10%), respectively; both user datagram protocol (UDP) 53 and transmission control protocol (TCP) 443 at n1 (e.g., 10%) and n2 (e.g., 90%), respectively; and both DNS and Web response times of t1 (e.g., 0.1 seconds(s)) and t2 (e.g., 0.1 s), respectively. At T2, after T1, the row 312 can include both USA and Europe client populations of p3 (e.g., 85%) and p4 (e.g., 15%), respectively; both UDP 53 and TCP 443 at n3 (e.g., 11%) and n4 (e.g., 89%), respectively; and both DNS and Web response times of t3 (e.g., 0.15 s) and t4 (e.g., 0.1 s), respectively. The network monitoring system may determine that each of the row 310 and 312 indicate normal operations (e.g., none of the metrics are outside of or satisfy predefined thresholds, a comparison between row 310 and 312 is within expected/normal operation) and record an indication of the state of row 310 and row 312 as being normal. At T3, after T2, the row 314 can include USA, Europe, and China client populations of p5, p6, and p7 (e.g., 10%, 5%, and 85%), respectively; UDP 53, TCP 443, and UDP 11211 at n5, n6, and n7 (e.g., 1%, 19%, and 80%), respectively; and both DNS and Web response times of t5 and t6 (e.g., 1.5 s and 5.2 s), respectively. The network monitoring system may compare the response time metrics to the previous response time metrics of rows 310 and 312 (e.g., known good response times) and determine that the difference between the row 314 response times and the previous row response times satisfies a threshold. Responsive to the determination, the network monitoring system may determine an indication of anomaly. The network monitoring system may record the state of row 314 as indicating an anomaly.

In some cases, the network monitoring system may revert the state of the network to a previous state. For example, based on determining the state of anomaly, the network monitoring system may generate one or more network policies to enable the network to return to previous conditions associated with normal operation (e.g., reverting to most recent metrics showing normal network conditions). Referring to the example of FIG. 3, the network monitoring system may generate rules to lock down the network environment. The rules may only allow clients from the USA and Europe regions to connect and only allow UDP 53 and TCP 443 traffic on the network. The network monitoring system may automatically apply the rules (the network policy) to block the unwanted traffic and revert back to the state found at row 312 (when only USA and Europe clients were active and only UDP 53 and TCP 443 traffic were active). Thus, traffic from Chinese clients, including the UDP 11211 traffic, will be blocked, most likely allowing for the resumption of acceptable response levels.

In some cases, the network monitoring system may classify the anomaly. For example, the anomaly may be a network attack. The network monitoring system may determine the type of attack and generate specific rules to stop this type of attack. For example, the network monitoring system may implement a type of GEO filter to block Chinese clients or a network access list which blocks (or rate limits) UDP 11211 network traffic. The network monitoring system may apply the GEO filter and/or the network access list and remove the network policy (e.g., a rapid response network policy, a temporal context monitoring and enforcement network policy).

In some cases, more or fewer metrics may be tracked (e.g., collected, received, and/or obtained). By collecting more metrics, the network monitoring system may generate more precise and strict network policies that reduce a risk of overblocking and of attack traffic bypassing the network polices. For example, if an attacker notices that using the UDP 11211 attack from China is no longer successful, the attacker may activate a botnet in Europe to send attack traffic to TCP port 443. However, by collecting the TCP 443 metric, the network monitoring system can implement a rate limiting network rule for clients of network traffic based on previously seen values (e.g., metrics associated with rows 312 and 310, limiting Europe to 15%). If the attacker activates a USA based botnet to send attack traffic on TCP port 443, by tracking network traffic per USA based client, the network monitoring system can implement a rule to disallow new USA clients to exceed previously seen levels. In some cases, based on other parameters (e.g., computational power, resources, tolerance for strictness, etc.) the network monitoring system may select more of fewer metrics to track.

Figure 4:
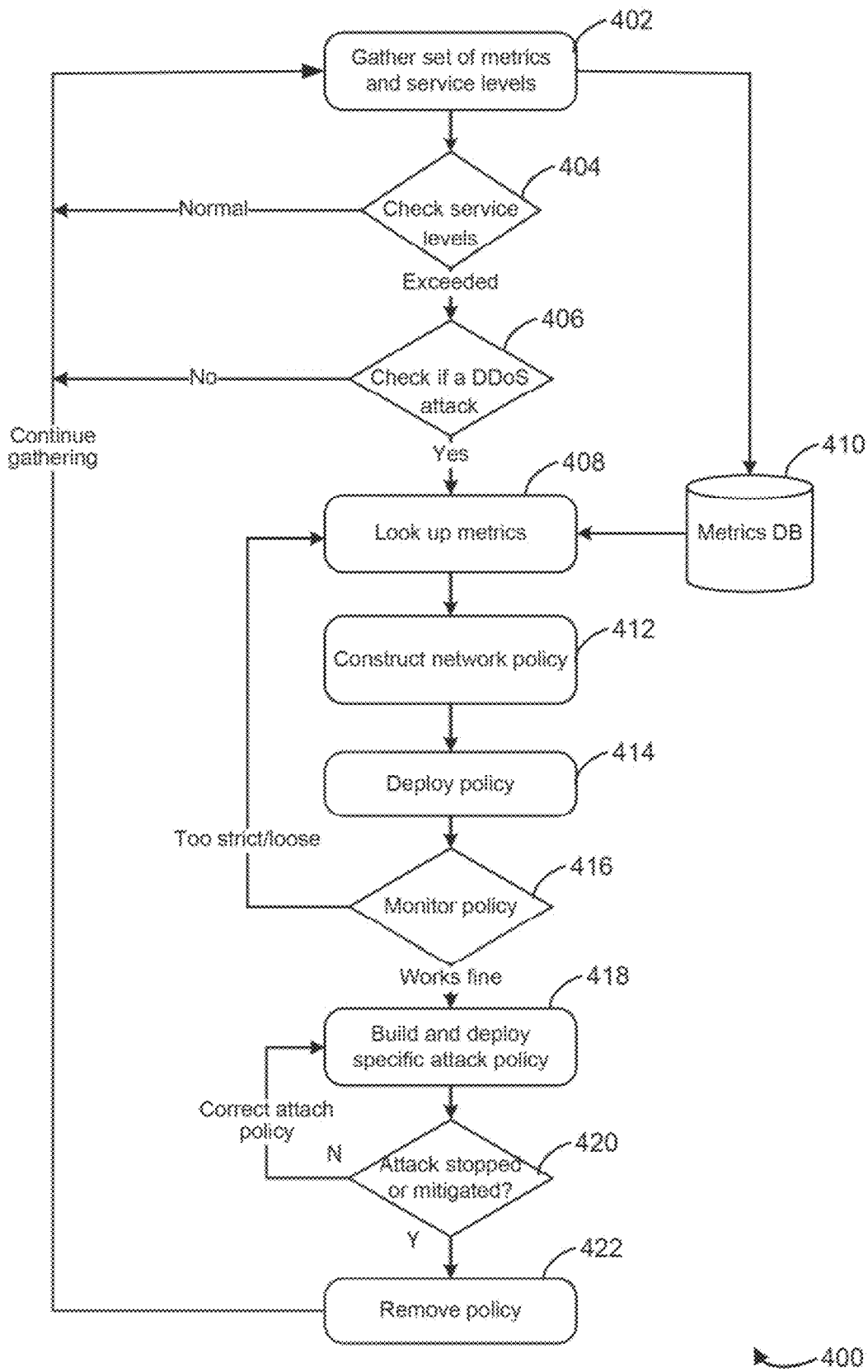
FIG. 4 is another flow diagram of a process for temporal context monitoring and enforcement for telecommunications networks, in accordance with an implementation.

FIG. 4 is a flow diagram of a process 400 for temporal context monitoring and enforcement for telecommunications networks, in accordance with an implementation. The process 400 can be performed by a data processing system (the data processing system 110, shown and described with reference to FIG. 1, a server system, etc.). The process 400 may include more or fewer operations and the operations may be performed in any order.

At operation 402, the data processing system gathers a set of metrics and service levels (e.g., values indicating amount of network service provided). For example, the data processing system can gather sets of metrics periodically, aperiodically, or in response to an event. The data processing system may store the set of metrics and the service levels. In some cases, the types of metrics and service levels the data processing system gathers may be adjustable. For example, the data processing system may automatically select which metrics and levels to gather. An operator of the data processing system may adjust the types of metrics and levels to gather. In some cases, the data processing system may gather the metrics and service levels via a network probe, via direct access to the network, or via the service providers.

At operation 404, the data processing system checks if service levels are within normal bounds. For example, the data processing system can compare the collected service levels with previous service levels. If the difference between the collected service levels and the previous service levels satisfies a threshold (e.g., the normal bounds), then the data processing system may determine the service levels exceed the normal bounds, indicating a potential anomaly (e.g., current response times are well above previous response times).

At operation 406, the data processing system checks for a potential DDOS attack. For example, the data processing system can use a rapid attack analysis. The data processing system may check traffic volume levels or check for attack patterns (e.g., known attack patterns) that relate to DDOS attacks. While the illustration of FIG. 4 uses a DDOS attack as an example, it is understood that the disclosure can be for other types of attacks or abnormal network behavior.

At operation 408, the data processing system looks up (e.g., retrieves, determines) the latest (e.g., most recent) set of metrics which are within acceptable service levels. For example, the data processing system may access a metrics database 410 (e.g., the metrics database 124). The data processing system may determine a most recent (e.g., a time closest to a current time) set of metrics associated with a normal state of operation (e.g., row 312). In some cases, the data processing system may perform an aggregation of a set of sets of metrics associated with the normal state (e.g., both rows 310 and 312). By aggregating (e.g., averaging) the sets of metrics, the data processing system may level out (e.g., determine an average) time-specific metrics (e.g., to account for time dependent metrics that, while captured at one time, relate to different time zones for different regions).

At operation 412, the data processing system constructs a network policy. The data processing system may use the metrics from operation 408 to construct the network policy. To do so, the data processing system may generate the network policy to allow network traffic that match the metrics (e.g., UDP 53 and TCP 443) and restrict network traffic that does not match the metrics (e.g., UDP 11211). In some cases, the data processing system may generate multiple network policies. The data processing system may generate a respective estimate of impact on the network if each network policy were to be applied. The data processing system may select a network policy based on the respective estimate of impact (e.g., least impact).

At operation 414, the data processing system applies (e.g., deploys) the network policy of the operation 412. For example, the data processing system may apply one or more rules to restrict network traffic on the network. At operation 416, the data processing system monitors the network policy after application. For example, the data processing system may collect and analyze another set of metrics after implementing the network policy. The data processing system may determine whether the network policy satisfies one or more thresholds based on analyzing the other set of metrics. If the network policy restricts an amount of desirable network traffic that satisfies a first threshold (e.g., is too strict), the data processing system may adjust the network policy to be looser (e.g., less strict, allowing more types of network traffic). If the network policy allows an amount of undesirable network traffic that satisfies a second threshold (e.g., is too loose), the data processing system may adjust the policy to be stricter (e.g., restricting more types of network traffic). For example, if a new service was deployed without communicating the deployment to the data processing system, the data processing system may mistakenly restrict network traffic to the new service. Thus, adjusting the network policy may allow for unintended events to be corrected.

At operation 418, the data processing system determines a type of anomaly. For example, after implementing the network policy, the data processing system may have time to determine a specific anomaly is occurring and generate an anomaly specific network policy. The data processing system may determine that the anomaly is of a first type. For example, the first type may be one of many types of anomalies that can indicate various attacks or undesirable network conditions. The data processing system may determine the anomaly to be of the first type based on one or more anomaly detecting techniques. The data processing system may build a second network policy (e.g., an attack policy) specific (e.g., situationally specific policy) to the first type of anomaly (e.g., attack). The data processing system may apply the second network policy to block the determined type of anomaly. At operation 420, the data processing system monitors the network to determine if the anomaly persists. If the anomaly persists, the data processing system may adjust (e.g., build another) the second network policy. At operation 422, the data processing system determines the anomaly to have stopped and may remove the network policy, the second network policy, or both. The data processing system continues back to operation 402.

Figure 5A:
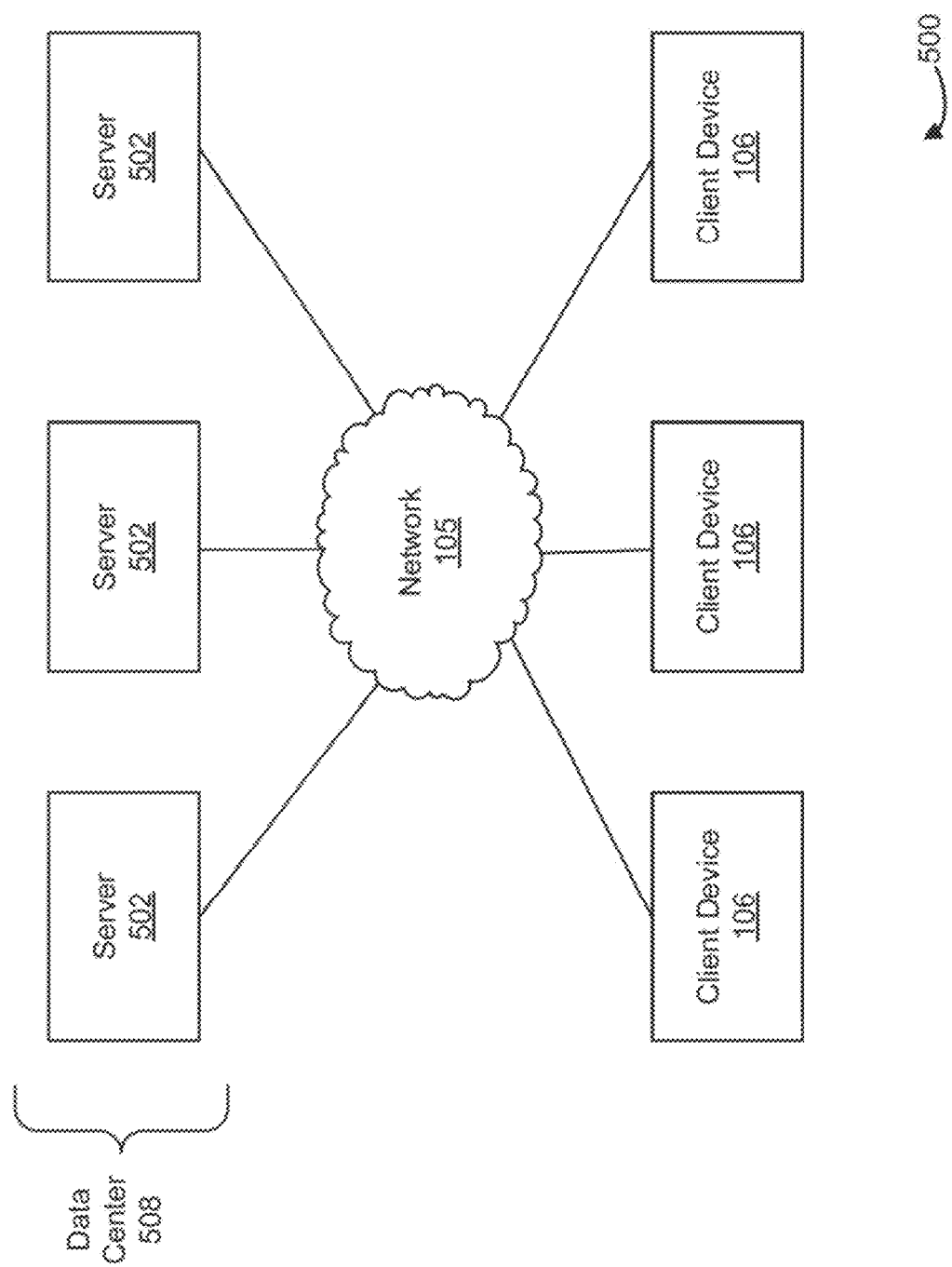
FIG. 5A is a block diagram depicting an implementation of a network environment including a client device in communication with a server device.

FIG. 5A depicts an example network environment that can be used in connection with the methods and systems described herein. In brief overview, the network environment 500 includes one or more client devices 106 (also generally referred to as clients, client node, client machines, client computers, client computing devices, endpoints, or endpoint nodes) in communication with one or more servers 502 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 5A shows a network 105 between the client devices 106 and the servers 502, the client devices 106 and the servers 502 can be on the same network 105. In embodiments, there are multiple networks 105 between the client devices 106 and the servers 502. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 500 can include multiple, logically grouped servers 502. The logical group of servers can be referred to as a data center 508 (or server farm or machine farm). In embodiments, the servers 502 can be geographically dispersed. The data center 508 can be administered as a single entity or different entities. The data center 508 can include multiple data centers 508 that can be geographically dispersed. The servers 502 within each data center 508 can be homogeneous or heterogeneous (e.g., one or more of the servers 502 or machines 502 can operate according to one type of operating system platform (e.g., WINDOWS NT, manufactured by Microsoft Corp. of Redmond, Washington), while one or more of the other servers 502 can operate on according to another type of operating system platform (e.g., Unix, Linux, or macOS)). The servers 502 of each data center 508 do not need to be physically proximate to another server 502 in the same machine farm 508. Thus, the group of servers 502 logically grouped as a data center 508 can be interconnected using a network. Management of the data center 508 can be de-centralized. For example, one or more servers 502 can comprise components, subsystems and modules to support one or more management services for the data center 508.

Server 502 can be a file server, application server, web server, proxy server, appliance, network appliance, gateway, gateway server, virtualization server, deployment server, SSL VPN server, or firewall. In embodiments, the server 502 can be referred to as a remote machine or a node. Multiple nodes can be in the path between any two communicating servers.

Figure 5B:
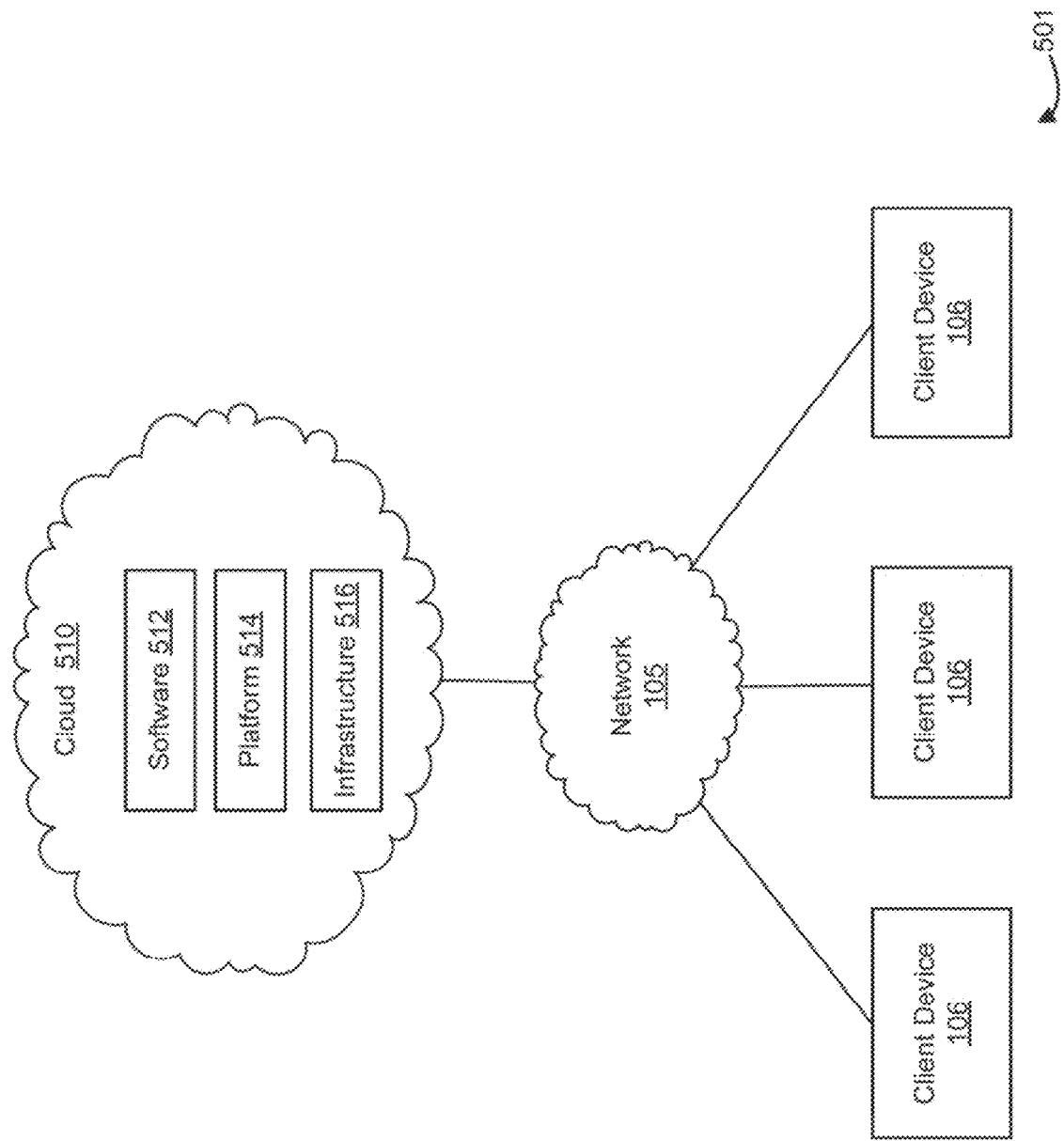
FIG. 5B is a block diagram depicting a computing environment including a client device in communication with service providers.

FIG. 5B illustrates an example computing environment. A computing environment 501 can provide client 106 with one or more resources provided by a network environment. The computing environment 501 (e.g., a cloud computing environment, an on premise computing environment, etc.) can include one or more client devices 106, in communication with the cloud 510 over one or more networks 105. Client devices 106 can include, e.g., thick clients, thin clients, and zero clients. A thick client can provide at least some functionality even when disconnected from the cloud 510 or servers 502. A thin client or a zero client can depend on the connection to the cloud 510 or server 502 to provide functionality. A zero client can depend on the cloud 510 or other networks 105 or servers 502 to retrieve operating system data for the client device. The cloud 510 can include back end platforms, e.g., servers 502, storage, server farms or data centers.

The cloud 510 can be public, private, or hybrid. Public clouds can include public servers 502 that are maintained by third parties to the client devices 106 or the owners of the clients. The servers 502 can be located off-site in remote geographical locations as disclosed above or otherwise. Public clouds can be connected to the servers 502 over a public network. Private clouds can include private servers 502 that are physically maintained by client devices 106 or owners of clients. Private clouds can be connected to the servers 502 over a private network 105. Hybrid clouds 508 can include both the private and public networks 105 and servers 502.

The cloud 510 can also include a cloud-based delivery, e.g. Software as a Service (Saas) 512, Platform as a Service (PaaS) 514, and the Infrastructure as a Service (IaaS) 516. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 502 can be deployed as and/or executed on any type and form of computing device, e.g., a computer, network device or appliance capable of communicating on any type and form of network and performing the operations described herein.

Figure 5C:
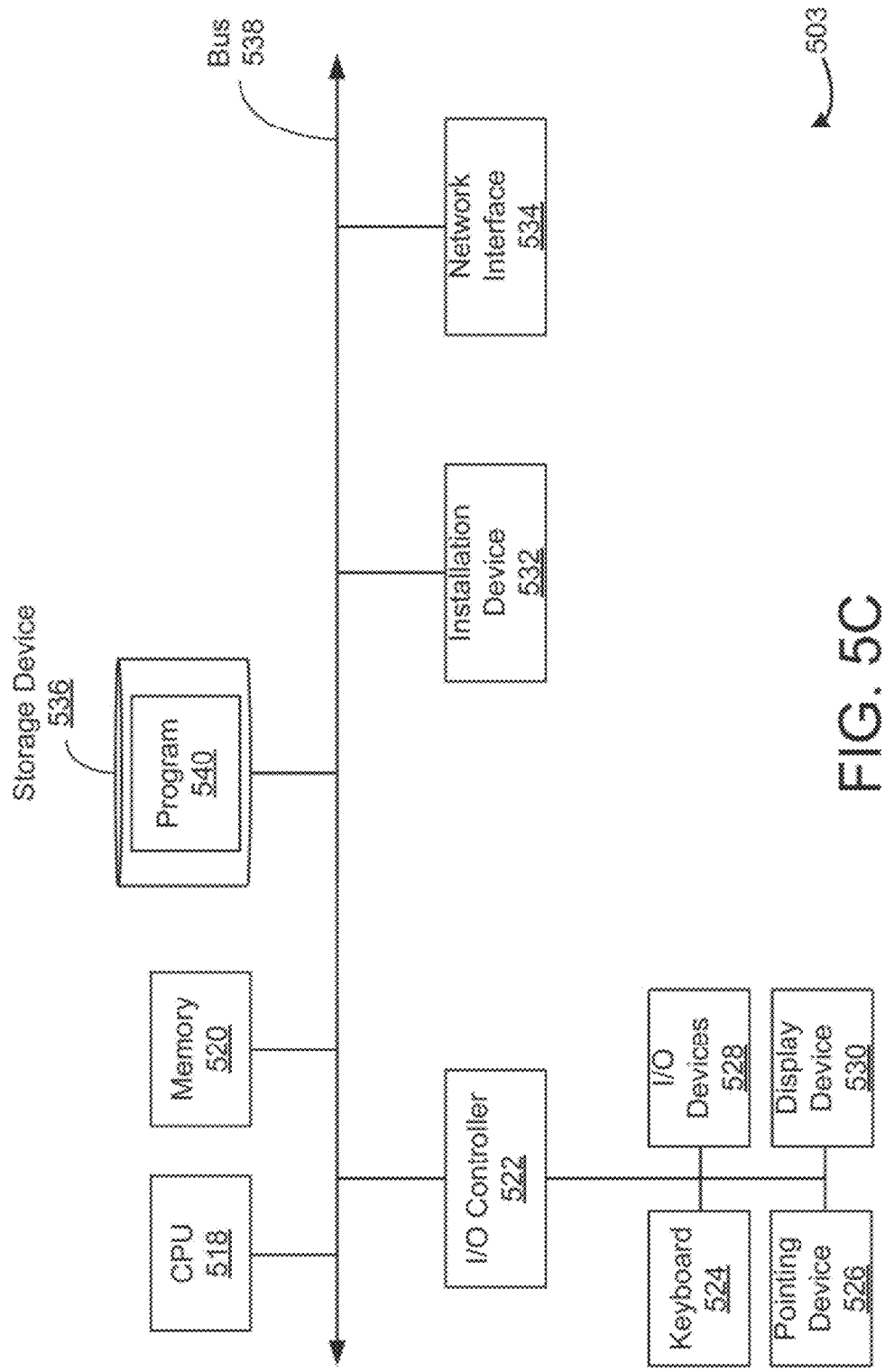
FIG. 5C is a block diagram depicting an implementation of a computing device that can be used in connection with the systems depicted in FIGS. 1, 5A and 5B, and the flow diagrams depicted in FIGS. 2 and 4.

FIG. 5C depicts block diagrams of a computing device 503 useful for practicing an embodiment of the client 106 or a server 502. As shown in FIG. 5C, each computing device 503 can include a central processing unit 518, and a main memory unit 520. As shown in FIG. 5C, a computing device 503 can include one or more of a storage device 536, an installation device 532, a network interface 534, an I/O controller 522, a display device 530, a keyboard 524 or a pointing device 526, e.g. a mouse. The storage device 536 can include, without limitation, a program 540, such as an operating system, software, or software associated with system 100.

The central processing unit 518 is any logic circuitry that responds to and processes instructions fetched from the main memory unit 520. The central processing unit 518 can be provided by a microprocessor unit, e.g.: those manufactured by Intel Corporation of Mountain View, California. The computing device 503 can be based on any of these processors, or any other processor capable of operating as described herein. The central processing unit 518 can utilize instruction level parallelism, thread level parallelism, different levels of cache, and multi-core processors. A multi-core processor can include two or more processing units on a single computing component.

Main memory unit 520 can include one or more memory chips capable of storing data and allowing any storage location to be directly accessed by the microprocessor 518. Main memory unit 520 can be volatile and faster than storage 536 memory. Main memory units 520 can be Dynamic random access memory (DRAM) or any variants, including static random access memory (SRAM). The memory 520 or the storage 536 can be non-volatile; e.g., non-volatile read access memory (NVRAM). The memory 520 can be based on any type of memory chip, or any other available memory chips. In the example depicted in FIG. 5C, the processor 518 can communicate with memory 520 via a system bus 538.

A wide variety of I/O devices 528 can be present in the computing device 503. Input devices 528 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 528 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 528, display devices 530 or group of devices can be augmented reality devices. The I/O devices can be controlled by an I/O controller 522 as shown in FIG. 5C. The I/O controller 522 can control one or more I/O devices, such as, e.g., a keyboard 524 and a pointing device 526, e.g., a mouse or optical pen. Furthermore, an I/O device can also provide storage and/or an installation device 532 for the computing device 503. In embodiments, the computing device 503 can provide USB connections (not shown) to receive handheld USB storage devices. In embodiments, an I/O device 528 can be a bridge between the system bus 538 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 530 can be connected to I/O controller 522. Display devices can include, e.g., liquid crystal displays (LCD), electronic papers (e-ink) displays, flexile displays, light emitting diode displays (LED), or other types of displays. In some embodiments, display devices 530 or the corresponding I/O controllers 522 can be controlled through or have hardware support for OPENGL or DIRECTX API or other graphics libraries. Any of the I/O devices 528 and/or the I/O controller 522 can include any type and/or form of suitable hardware, software, or combination of hardware and software to support, enable or provide for the connection and use of one or more display devices 530 by the computing device 503. For example, the computing device 503 can include any type and/or form of video adapter, video card, driver, and/or library to interface, communicate, connect or otherwise use the display devices 530. In embodiments, a video adapter can include multiple connectors to interface to multiple display devices 530.

The computing device 503 can include a storage device 536 (e.g., one or more hard disk drives or redundant arrays of independent disks) for storing an operating system or other related software, and for storing application software programs 540 such as any program related to the systems, methods, components, modules, elements, or functions depicted in FIG. 1, or 2. Examples of storage device 536 include, e.g., hard disk drive (HDD); optical drive including CD drive, DVD drive, or BLU-RAY drive; solid-state drive (SSD); USB flash drive; or any other device suitable for storing data. Storage devices 536 can include multiple volatile and non-volatile memories, including, e.g., solid state hybrid drives that combine hard disks with solid state cache. Storage devices 536 can be non-volatile, mutable, or read-only. Storage devices 536 can be internal and connect to the computing device 503 via a bus 538. Storage device 536 can be external and connect to the computing device 503 via an I/O device 530 that provides an external bus. Storage device 536 can connect to the computing device 503 via the network interface 534 over a network 105. Some client devices 106 may not require a non-volatile storage device 536 and can be thin clients or zero client devices 106. Some storage devices 536 can be used as an installation device 532 and can be suitable for installing software and programs.

The computing device 503 can include a network interface 534 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 503 can communicate with other computing devices 503 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 534 can include a built-in network adapter, network interface card, PCMCIA network card, EXPRESSCARD network card, card bus network adapter, wireless network adapter, USB network adapter, modem or any other device suitable for interfacing the computing device 503 to any type of network capable of communication and performing the operations described herein.

A computing device 503 of the sort depicted in FIG. 5C can operate under the control of an operating system, which controls scheduling of tasks and access to system resources. The computing device 503 can be running any operating system configured for any type of computing device, including, for example, a desktop operating system, a mobile device operating system, a tablet operating system, or a smartphone operating system.

The computing device 503 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 503 has sufficient processor power and memory capacity to perform the operations described herein. In some embodiments, the computing device 503 can have different processors, operating systems, and input devices consistent with the device.

In embodiments, the status of one or more machines 106, 502 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 503 in response to the CPU 518 executing an arrangement of instructions contained in main memory 520. Such instructions can be read into main memory 520 from another computer-readable medium, such as the storage device 536. Execution of the arrangement of instructions contained in main memory 520 causes the computing device 503 to perform the illustrative processes described herein. One or more processors in a multi-processing arrangement may also be employed to execute the instructions contained in main memory 520. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

At least one aspect of a technical improvement to existing techniques is directed to a method. The method may comprise collecting, by one or more processors, a first set of metrics associated with a network at a first time, the first set of metrics indicating a first state of the network; collecting, by the one or more processors, a second set of metrics associated with the network at a second time, the second set of metrics indicating a second state of the network; determining, by the one or more processors, an indication of an anomaly on the network based on a comparison of the second set of metrics with the first set of metrics; and applying, by the one or more processors, a network policy to revert the network from the second state to the first state in response to determining the indication of the anomaly.

At least one aspect of this technical solution is directed to a system. The system may comprise one or more memories having computer-readable instructions stored thereon. The one or more memories may be in communication with a one or more processors that execute the computer readable instructions to collect a first set of metrics associated with a network at a first time, the first set of metrics indicating a first state of the network; collect a second set of metrics associated with the network at a second time, the second set of metrics indicating a second state of the network; determine an indication of an anomaly on the network based on a comparison of the second set of metrics with the first set of metrics; and apply a network policy to revert the network from the second state to the first state in response to determining the indication of the anomaly.

At least one aspect of this technical solution is directed to a non-transitory computer-readable storage media comprising computer readable instructions stored thereon that, when executed by one or more processors, cause the one or more processors to collect a first set of metrics associated with a network at a first time, the first set of metrics indicating a first state of the network; collect a second set of metrics associated with the network at a second time, the second set of metrics indicating a second state of the network; determine an indication of an anomaly on the network based on a comparison of the second set of metrics with the first set of metrics; and apply a network policy to revert the network from the second state to the first state in response to determining the indication of the anomaly.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of a probe or the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
collecting, by one or more processors, a first set of metrics associated with a network at a first time, the first set of metrics indicating a first state of the network, and storing the first set of metrics in association with the first state in a memory at the first time;

collecting, by the one or more processors, a second set of metrics associated with the network at a second time, the second set of metrics indicating a second state of the network;

determining, by the one or more processors, an indication of an anomaly on the network based on a comparison of the second set of metrics with the first set of metrics; and applying, by the one or more processors, a network policy to revert the network from the second state to the first state by restoring network traffic attributes and operational parameters of the network to match the stored first set of metrics, wherein the reverting is performed prior to determining a type of anomaly associated with the anomaly, thereby enabling rapid restoration regardless of the anomaly type, in response to determining the indication of the anomaly.

2. The method of claim 1, comprising:
monitoring the network in response to applying the network policy; and
taking action based on the monitoring.

3. The method of claim 2, wherein the action taken comprises adjusting the network policy to increase a limitation of network traffic on the network or to reduce a limitation of network traffic on the network responsive to determining an impact of the network policy on the network.

4. The method of claim 2, wherein the action taken comprises:
determining a type of anomaly associated with the anomaly;
applying a second network policy based on the type of anomaly; and
removing the network policy responsive to applying the second network policy.

5. The method of claim 1, wherein applying the network policy comprises selecting at least one of the first set of metrics to implement on the network.

6. The method of claim 5, wherein the at least one of the first metrics that is selected is based on a type of the anomaly.

7. The method of claim 1, wherein applying the network policy comprises generating a set of network rules associated with limiting network traffic on the network.

8. The method of claim 1, wherein the collecting the first set of metrics comprises:
collecting, over a period of time, a plurality of sets of metrics indicating the first state; and
determining the network policy based on a combination of one or more sets of metrics of the plurality of sets of metrics.

9. The method of claim 1, wherein at least one of the first set of metrics or the second set of metrics comprise at least one of one or more packet level metrics, one or more application metrics, one or more traffic metrics, or one or more service response metrics.

10. The method of claim 1, wherein the first state is a state of normal operation of the network and the second state is a state of anomaly of the network.

11. A system, comprising:
one or more memories having computer-readable instructions stored thereon; and
one or more processors that execute the computer-readable instructions to:
collect a first set of metrics associated with a network at a first time, the first set of metrics indicating a first state of the network, and store the first set of metrics in association with the first state in a memory at the first time;
collect a second set of metrics associated with the network at a second time, the second set of metrics indicating a second state of the network;
determine an indication of an anomaly on the network based on a comparison of the second set of metrics with the first set of metrics; and
apply a network policy to revert the network from the second state to the first state by restoring network traffic attributes and operational parameters of the network to match the stored first set of metrics, wherein the reverting is performed prior to determining a type of anomaly associated with the anomaly, thereby enabling rapid restoration regardless of the anomaly type, in response to determining the indication of the anomaly.

12. The system of claim 11, wherein the one or more processors further:
monitor the network in response to applying the network policy; and
take action based on the monitoring.

13. The system of claim 12, wherein the action taken comprises the one or more processors that execute the computer-readable instructions to adjust the network policy to increase a limitation of network traffic on the network or to reduce a limitation of network traffic on the network responsive to determining an impact of the network policy on the network.

14. The system of claim 11, wherein the one or more processors that execute the computer-readable instructions to apply the network policy further generate a set of network rules associated with limiting network traffic on the network.

15. The system of claim 11, wherein the one or more processors that execute the computer-readable instructions to apply the network policy to further select at least one of the first set of metrics to implement on the network.

16. The system of claim 11, wherein the one or more processors that execute the computer-readable instructions to collect the first set of metrics further:
collect, over a period of time, a plurality of sets of metrics indicating the first state; and
determine the network policy based on a combination of one or more sets of metrics of the plurality of sets of metrics.

17. A non-transitory computer-readable storage media comprising computer-readable instructions stored thereon that, when executed by one or more processors, cause the one or more processors to:
collect a first set of metrics associated with a network at a first time, the first set of metrics indicating a first state of the network, and store the first set of metrics in association with the first state in a memory at the first time;
collect a second set of metrics associated with the network at a second time, the second set of metrics indicating a second state of the network;
determine an indication of an anomaly on the network based on a comparison of the second set of metrics with the first set of metrics; and
apply a network policy to revert the network from the second state to the first state by restoring network traffic attributes and operational parameters of the network to match the stored first set of metrics, wherein the reverting is performed prior to determining a type of anomaly associated with the anomaly, thereby enabling rapid restoration regardless of the anomaly type, in response to determining the indication of the anomaly.

18. The medium of claim 17, wherein the computer-readable instructions stored thereon that, when executed by the processor, cause the processor to apply the network policy further generate a set of network rules associated with limiting network traffic on the network.

19. The medium of claim 17, wherein the computer-readable instructions stored thereon that, when executed by the processor, cause the processor to apply the network policy to further select at least one of the first set of metrics to implement on the network.

20. The medium of claim 17, comprising computer-readable instructions stored thereon that, when executed by the processor, cause the processor to:
   monitor the network in response to applying the network policy; and
   take action based on the monitoring.

\* \* \* \* \*